Patented Oct. 12, 1926.

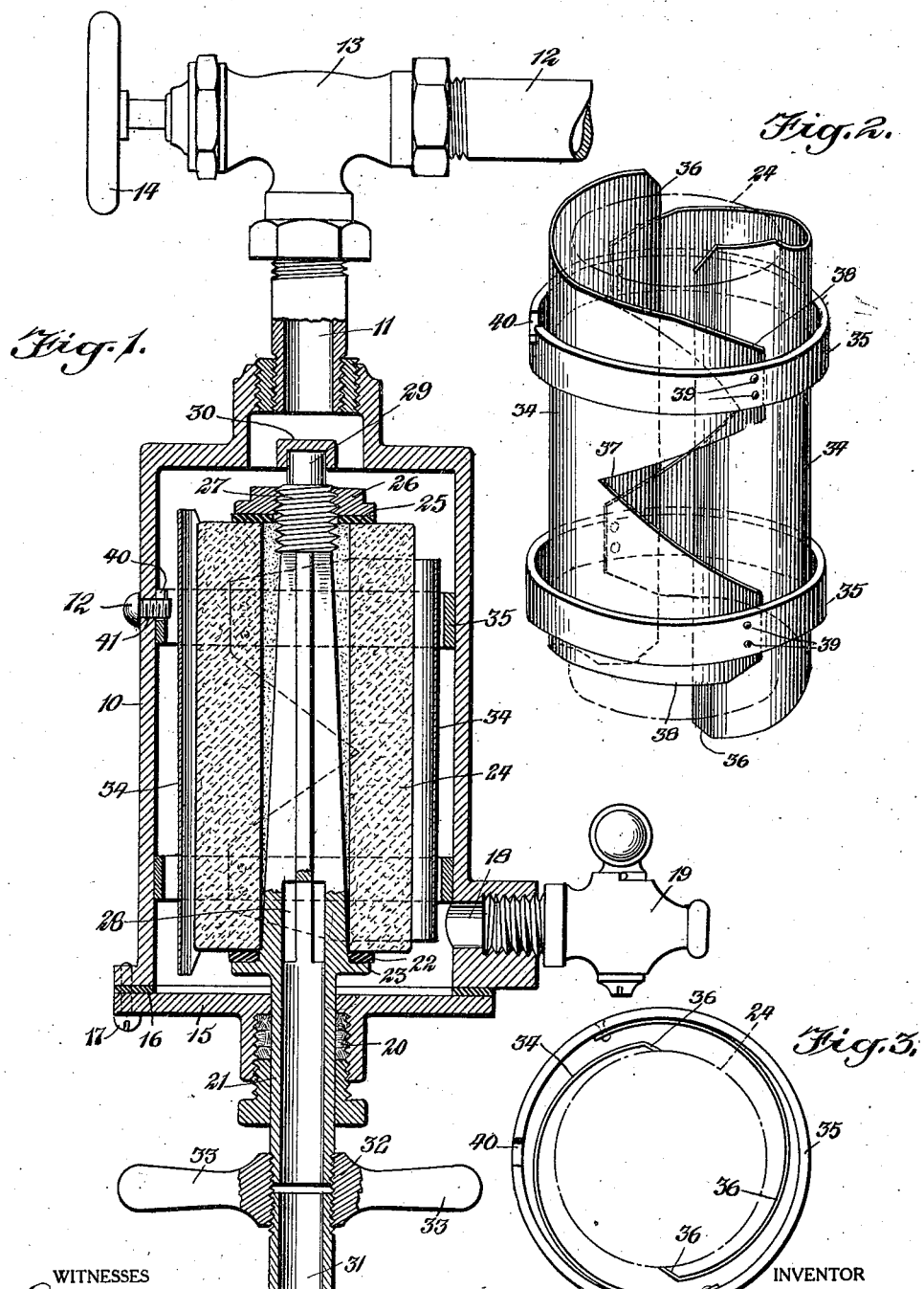

1,603,126

UNITED STATES PATENT OFFICE.

THEODORE LINKE, OF NEW YORK, N. Y.

FILTER.

Application filed January 29, 1926. Serial No. 84,765.

This invention relates to improvements in filters, and is particularly concerned with the provision of novel means for detachably mounting the scrapers for the filter stone. The filters as conventionally constructed usually include a filter casing within which the water to be filtered is passed through a filter stone. Associated with the stone are one or more scrapers for removing from the surface of the stone, slime and foreign matter which is separated from the water. Usually some means is provided for manually effecting relative movement of the stone and scrapers to remove this deposit, after which the casing is flushed to carry off the deposit from the scrapers. It has been heretofore customary to permanently attach the scrapers directly to the casing wall, with the result that it has been exceedingly difficult to remove and replace a worn scraper.

In accordance with the present invention, I mount the scrapers in a cage structure and detachably secure the latter within the casing, thereby providing a scraper unit which may be readily removed, repaired and replaced.

By virtue of this new feature, I provide a filter of simple, practical construction which may be readily taken apart, and cleaned or repaired, which will be rugged and durable in use, and which will be well suited to the requirements of economical manufacture and assembly.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein, Fig. 1 is a view mainly in longitudinal section through a filter embodying the present invention.

Fig. 2 is a perspective view of the scraper unit showing the same removed from the casing, the filter stone being indicated in dotted lines.

Fig. 3 is a top plan view of the scraper unit, the filter stone again being indicated in dotted lines.

In the drawings I have used the reference character 10 to designate a cylindrical filter casing. Entering the upper end of the casing is a water supply pipe 11 connected to a main supply line 12 through the intermediacy of a T-coupling 13. Within the coupling there is a suitable valve controlled by a hand wheel 14 which may be manually rotated to shut off the supply of water to the filter casing. The lower end of the casing is closed by plate 15 held against a packing ring 16 by screws 17 or other suitable securing devices. Near the lower end of the casing I also provide a drain outlet 18 for unfiltered water, this outlet being controlled by suitable petcock 19.

Journalled in a suitable packing or stuffing box 20 in the plate 15, is a hollow spindle 21 which serves as an outlet pipe for filtered water. A packing gasket 22 seated on an annular flange 23 integral with the spindle 21 supports and seals the lower end of a hollow filter stone 24. The upper end of the stone is closed by packing ring 25 acted on by a nut 26 threaded on to the upper solid threaded end 27 of the spindle, the portion of the spindle between the threaded section 27 and the lower tubular discharge end being of general skeleton formation providing lateral inlet ports 28 communicating with the interior of the filter stone. The spindle at its upper end terminates in a reduced cylindrical portion 29 borne in a socket 30 rigidly connected to the casing 10 by a spider (not shown). The device as thus far described may be entirely conventional, and the flow of filtered water through the spindle 21 may be controlled either by the valve 14 or by an additional valve (not shown), connected to an outlet pipe 31. The spindle 21 is preferably coupled to the outlet pipe by nut 32 formed with a plurality of radially extending handle arms 33.

The present invention is more particularly concerned with the provision of novel means for supporting and mounting the scrapers 34. The scraper unit shown in perspective in Fig. 2, includes a pair of spaced cage rings 35. Each of the scrapers are approximately semi-circular in cross section, and are formed of spring metal plates. The free ends of the scrapers are turned inwardly as at 36 to define scraping edges engaging the filter stone, and the other ends of the scrapers are bifurcated as at 37 defining a pair of tongues 38 riveted or otherwise secured as at 39 to the rings 35. Thus, the entire scraper unit may be bodily inserted within the lower end of the casing when the plate 15, spindle 21 and filter stone 24 are removed. Preferably the upper ring 35 is formed with a notch 40 in its upper edge adapted to align with an opening 41 in the filter casing wall, through which a retaining screw 42 is passed. This screw effectively prevents rotational movement of the cage rings 35 which carry the scrapers and may if desired have an actual threaded connection with the upper cage ring to prevent movement of the rings in any direction.

The operation of the device is substantially as follows. In assembling, the scraper unit is inserted first through the lower end of the casing. The filter stone is mounted on the spindle 21, and the spindle and stone are inserted. The bottom plate 15 is then applied, and the handle nut 32, pipe 31, and such additional valving as may be deemed necessary are subsequently attached.

In the ordinary use of the filter, the water flows into the casing through the pipe 11 and around the stone, filtering through the stone it passes to discharge through the spindle 21 and pipe 31. After the filter has been in use for a certain length of time, the water flow is retarded by the accumulation of a slimy deposit of foreign matter on the exterior surface of the stone. At this time, the discharge valve for filtered water (not shown), is cut off. The handle 33 is grasped and rotated, effecting rotation of the filter stone relative to the scrapers, which, by their own inherent resiliency, press inwardly against the stone. Inasmuch as the stone is relatively soft, the scrapers will quickly remove the foreign matter from its surface. The petcock 19 is then opened, and by flushing water through the filter casing, this foreign matter will be washed from the scraper blades and carried off through the petcock, and a fresh stone surface exposed.

It will be evident that the novel construction of the removable scraper unit greatly facilitates not only the original assembly of the filter, but greatly expedites repairs or replacements of scraper blades.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a filter, the combination with a filter casing having water inlet and discharge openings therein, and a rotatably mounted hollow filter stone in the casing through which water in the inlet opening passes to the discharge opening, of a scraper unit removably mounted in the casing, including a pair of spaced cage rings fitting within the casing, scraper blades each secured at one edge to the rings, and each including free scraping edges bearing against the stone, means projecting inwardly from the casing wall into a notch in one of the rings preventing rotation of the scraper unit relative to the casing.

2. As a new article of manufacture, a scraper unit of the class described including a pair of cage rings, spring scraper blades each secured at one edge to the rings and each including inwardly presented free scraping edges, one of the rings being notched for the purpose described.

3. As a new article of manufacture, a scraper unit of the class described including a pair of cage rings, spring scraper blades each secured at one edge to the rings and each including inwardly presented free scraping edges, the fixed ends of the blades being bifurcated to define a pair of tongues attached to the respective rings.

THEODORE LINKE.